United States Patent
Fiveland et al.

(10) Patent No.: US 9,188,084 B2
(45) Date of Patent: Nov. 17, 2015

(54) FUEL SYSTEM HAVING A COOLED INJECTOR

(71) Applicant: Electro-Motive Diesel, Inc., La Grange, IL (US)

(72) Inventors: Scott B. Fiveland, Metamora, IL (US); Farhan Devani, Morton Grove, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 464 days.

(21) Appl. No.: 13/665,710

(22) Filed: Oct. 31, 2012

(65) Prior Publication Data

US 2014/0116393 A1 May 1, 2014

(51) Int. Cl.
*F02M 69/04* (2006.01)
*F02M 61/14* (2006.01)
*F02M 21/02* (2006.01)
*F02M 53/04* (2006.01)
*F02B 7/06* (2006.01)
*F02B 7/08* (2006.01)
*F02B 25/04* (2006.01)
*F02M 31/20* (2006.01)
*F02D 19/10* (2006.01)
*F01P 3/16* (2006.01)

(52) U.S. Cl.
CPC .............. *F02M 21/0275* (2013.01); *F01P 3/16* (2013.01); *F02B 7/06* (2013.01); *F02B 7/08* (2013.01); *F02B 25/04* (2013.01); *F02D 19/105* (2013.01); *F02M 21/0278* (2013.01); *F02M 21/0284* (2013.01); *F02M 31/20* (2013.01); *F02M 53/043* (2013.01)

(58) Field of Classification Search
CPC ........ F02M 31/00; F02M 53/00; F02M 53/04; F02M 53/043; F02M 21/02; F02M 21/0278; F02M 51/06; F02M 51/08; F02M 61/14; F02M 61/145; F02M 69/04; F02M 2700/077
See application file for complete search history.

(56) References Cited

U.S. PATENT DOCUMENTS

| | | | |
|---|---|---|---|
| 946,406 | A | 1/1910 | Söhnlein |
| 2,267,333 | A | 12/1941 | Jacoby et al. |
| 2,367,029 | A | 1/1945 | Jameson |
| 2,686,503 | A | 8/1954 | Reddy et al. |
| 4,088,098 | A | 5/1978 | Rose et al. |
| 4,091,772 | A | 5/1978 | Heater et al. |
| 4,527,516 | A | 7/1985 | Foster |
| 4,579,093 | A | 4/1986 | Eanes |
| 4,679,538 | A | 7/1987 | Foster |
| 4,957,089 | A | 9/1990 | Morikawa |
| 5,035,206 | A | 7/1991 | Welch et al. |

(Continued)

FOREIGN PATENT DOCUMENTS

| | | |
|---|---|---|
| EP | 0432153 B1 | 6/1991 |
| EP | 2441941 A2 | 4/2012 |

(Continued)

*Primary Examiner* — Thomas Moulis
*Assistant Examiner* — Elizabeth Hadley
(74) *Attorney, Agent, or Firm* — Finnegan, Henderson, Farabow, Garrett & Dunner, LLP

(57) ABSTRACT

A fuel system for an engine is disclosed. The fuel system may have a gaseous fuel injector configured to inject gaseous fuel radially into a cylinder of the engine. The fuel system may also have a primary cooling line configured to circulate coolant through the engine. The fuel system may also have an auxiliary cooling line fluidly connecting the primary cooling line with the gaseous fuel injector.

20 Claims, 2 Drawing Sheets

(56) References Cited

U.S. PATENT DOCUMENTS

| | | |
|---|---|---|
| 5,251,580 A | 10/1993 | Torigai |
| 5,271,357 A | 12/1993 | Hsu et al. |
| 5,357,919 A | 10/1994 | Ma |
| 5,517,954 A | 5/1996 | Melchior |
| 5,588,402 A | 12/1996 | Lawrence |
| 5,860,394 A * | 1/1999 | Saito et al. ............... 123/41.31 |
| 6,240,892 B1 | 6/2001 | Sweeney |
| 6,318,344 B1 | 11/2001 | Lucier et al. |
| 6,523,529 B1 | 2/2003 | Moncelle |
| 6,622,667 B1 * | 9/2003 | Doers .................. 123/41.31 |
| 6,640,792 B2 | 11/2003 | Harvey et al. |
| 6,675,748 B2 | 1/2004 | Ancimer et al. |
| 7,021,558 B2 * | 4/2006 | Chenanda et al. ............ 239/125 |
| 7,028,918 B2 | 4/2006 | Buchanan et al. |
| 7,090,145 B2 | 8/2006 | Baker et al. |
| 7,168,241 B2 | 1/2007 | Rudelt et al. |
| 7,207,321 B2 | 4/2007 | Vadimovitch et al. |
| 7,225,793 B2 | 6/2007 | Schwulst et al. |
| 7,343,895 B2 | 3/2008 | Mark |
| 7,481,048 B2 | 1/2009 | Harmon et al. |
| 8,051,830 B2 | 11/2011 | Taylor |
| 8,056,326 B2 * | 11/2011 | Cox et al. ................. 60/295 |
| 9,046,068 B2 * | 6/2015 | Fiveland et al. ............... 61/14 |
| 2004/0149255 A1 | 8/2004 | zur Loye et al. |
| 2009/0084346 A1 | 4/2009 | Zhou et al. |
| 2012/0031354 A1 * | 2/2012 | Beyer et al. ............... 123/41.79 |
| 2012/0037124 A1 * | 2/2012 | Peters et al. .................. 123/470 |
| 2012/0073264 A1 | 3/2012 | Li et al. |
| 2012/0325926 A1 * | 12/2012 | Moore et al. ..................... 239/5 |
| 2013/0228231 A1 * | 9/2013 | Nagel et al. .................. 137/334 |
| 2013/0306029 A1 * | 11/2013 | Stockner et al. ............. 123/445 |
| 2014/0116390 A1 * | 5/2014 | Foege ......................... 123/468 |

FOREIGN PATENT DOCUMENTS

| | | |
|---|---|---|
| JP | 5202756 A | 8/1993 |
| WO | WO 2011/002351 A1 | 1/2011 |
| WO | WO 2011/002353 A1 | 1/2011 |
| WO | WO 2011/139932 A1 | 11/2011 |

* cited by examiner

FUEL SYSTEM HAVING A COOLED INJECTOR

TECHNICAL FIELD

The present disclosure is directed to a fuel system and, more particularly, to a fuel system having a cooled injector.

BACKGROUND

Due to the rising cost of liquid fuel (e.g. diesel fuel) and ever increasing restrictions on exhaust emissions, engine manufacturers have developed dual-fuel engines. An exemplary dual-fuel engine provides injections of a low-cost gaseous fuel (e.g. natural gas) through air intake ports of the engine's cylinders. The gaseous fuel is introduced with clean air that enters through the intake ports and is ignited by liquid fuel that is injected during each combustion cycle. Because a lower-cost fuel is used together with liquid fuel, cost efficiency may be improved. In addition, the combustion of the gaseous and liquid fuel mixture may result in a reduction of harmful emissions.

Engine parts near the cylinders may be exposed to high temperatures associated with fuel combustion. For example, in a dual-fuel engine utilizing gaseous fuel injectors at each cylinder's air intake ports, the efficiency and integrity of these injectors may be materially affected by the extreme temperatures. Various cooling systems have been developed to cool injectors to workable temperatures and to achieve desirable efficiency and part lifetime.

An exemplary arrangement for cooling a liquid injector is disclosed in U.S. Pat. No. 7,021,558 that issued to Chenanda et al. on Apr. 4, 2006. In particular, the '558 patent discloses a liquid fuel injector having a cooled lower nozzle body. The liquid fuel injector includes an additional fuel passage in the lower nozzle body that receives a metered amount of fuel. This additional passage provides greater surface area over which fuel can flow. The additional surface area improves cooling of the liquid fuel injector by exposing more of the lower nozzle body to the relatively low-temperature fuel.

Although the design in the '558 patent may improve cooling of a liquid fuel injector, its applicability may be limited. For instance, the use of a single cooling passage may limit the cooling effect. In addition, other parts of the injector, such as electrical components, may not be sufficiently cooled by the additional passage inside the lower nozzle body. Further, the additional passage may not be practical for gaseous fuel injectors that typically require larger nozzles with fewer restrictions.

The disclosed fuel system is directed to overcoming one or more of the problems set forth above and/or other problems of the prior art.

SUMMARY

In one aspect, the present disclosure is directed to a fuel system for an engine. The fuel system may include a gaseous fuel injector configured to inject gaseous fuel radially into a cylinder of the engine. The fuel system may also include a primary cooling line configured to circulate coolant through the engine. The fuel system may also include an auxiliary cooling line fluidly connecting the primary cooling line with the gaseous fuel injector.

In another aspect, the present disclosure is directed to a method of cooling a fuel injector of an engine. The method may include circulating a coolant via a primary cooling line located in an air box of the engine. The method may also include directing the coolant through an auxiliary cooling line to a gaseous fuel injector to cool the gaseous fuel injector. The method may additionally include returning the coolant to the engine.

DETAILED DESCRIPTION

Figure 1:
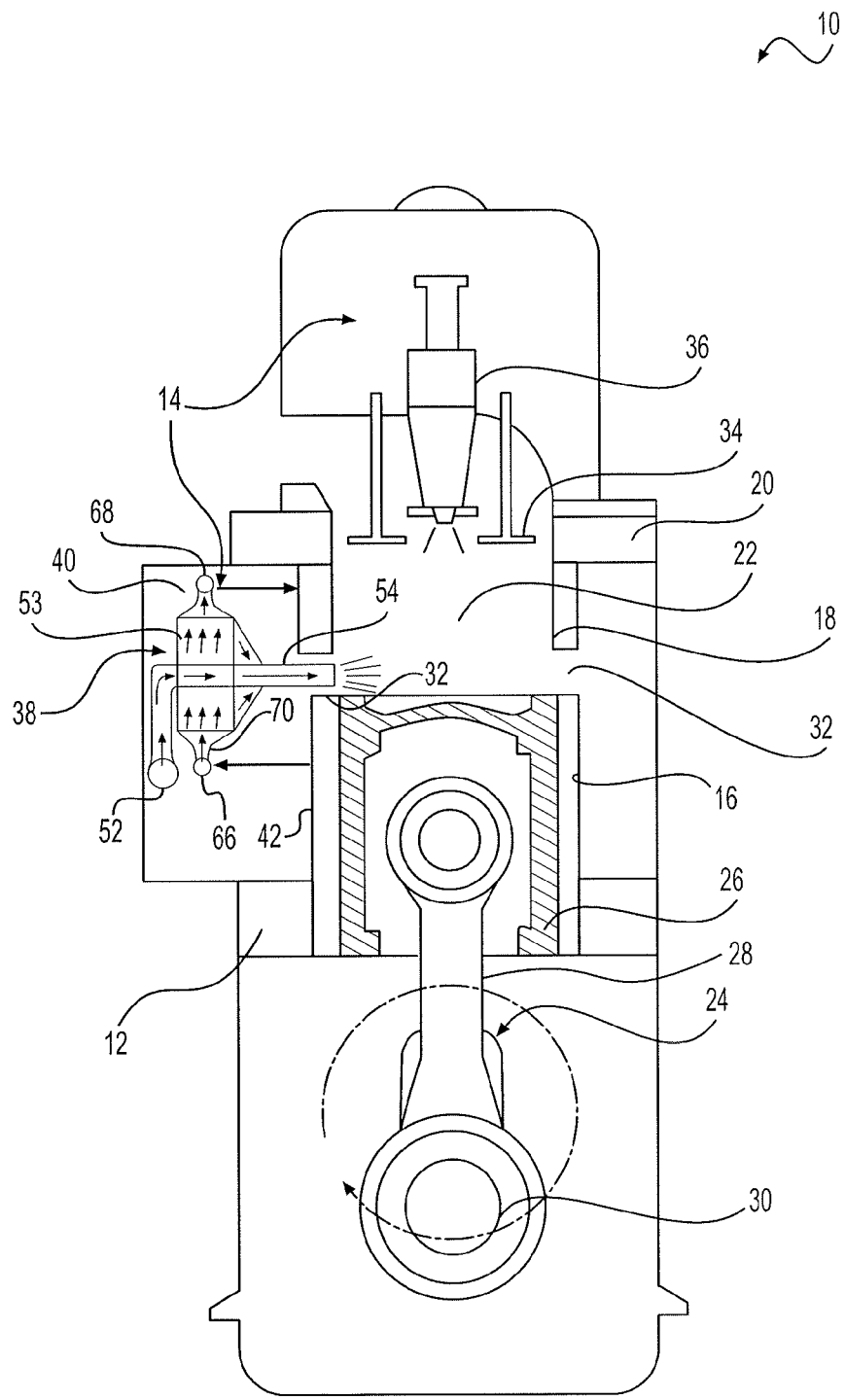
FIG. 1 is a cross-sectional illustration of a dual-fuel engine equipped with an exemplary disclosed fuel system.

FIG. 1 illustrates an exemplary internal combustion engine 10. Engine 10 is depicted and described as a two-stroke dual-fuel engine. Engine 10 may include an engine block 12 that at least partially defines a plurality of cylinders 16 (only one shown), each having an associated cylinder head 20. A cylinder liner 18 may be disposed within each engine cylinder 16, and cylinder head 20 may close off an end of liner 18. A piston 24 may be slidably disposed within each cylinder liner 18. Each cylinder liner 18, cylinder head 20, and piston 24 may together define a combustion chamber 22 that receives fuel from a fuel system 14 mounted to engine 10. It is contemplated that engine 10 may include any number of engine cylinders 16 with corresponding combustion chambers 22.

Within engine cylinder liner 18, piston 24 may be configured to reciprocate between a bottom-dead-center (BDC) or lower-most position, and a top-dead-center (TDC) or upper-most position. In particular, piston 24 may be an assembly that includes a piston crown 26 pivotally connected to a rod 28, which may in turn be pivotally connected to a crankshaft 30. Crankshaft 30 of engine 10 may be rotatably disposed within engine block 12 and each piston 24 coupled to crankshaft 30 by rod 28 so that a sliding motion of each piston 24 within liner 18 results in a rotation of crankshaft 30. Similarly, a rotation of crankshaft 30 may result in a sliding motion of piston 24. As crankshaft 30 rotates through about 180 degrees, piston crown 26 and connected rod 28 may move through one full stroke between BDC and TDC. Engine 10, being a two-stroke engine, may have a complete cycle that includes a power/exhaust/intake stroke (TDC to BDC) and an intake/compression stroke (BDC to TDC).

During a final phase of the power/exhaust/intake stroke described above, air may be drawn into combustion chamber 22 via one or more gas exchange ports (e.g., air intake ports) 32 located within a sidewall of cylinder liner 18. In particular, as piston 24 moves downward within liner 18, a position will eventually be reached at which air intake ports 32 are no longer blocked by piston 24 and instead are fluidly communicated with combustion chamber 22. When air intake ports 32 are in fluid communication with combustion chamber 22 and a pressure of air at air intake ports 32 is greater than a pressure within combustion chamber 22, air will pass through air intake ports 32 into combustion chamber 22. It is contemplated that gaseous fuel (e.g. methane or natural gas), may be introduced into combustion chamber 22 (e.g. radially injected) through at least one of air intake ports 32. The gaseous fuel may mix with the air to form a fuel/air mixture within combustion chamber 22.

Eventually, piston 24 will start an upward movement that blocks air intake ports 32 and compresses the air/fuel mixture. As the air/fuel mixture within combustion chamber 22 is compressed, a temperature of the mixture may increase. At a point when piston 24 is near TDC, a liquid fuel (e.g. diesel or other petroleum-based liquid fuel) may be injected into combustion chamber 22 via a liquid fuel injector 36. The liquid fuel may be ignited by the hot air/fuel mixture, causing combustion of both types of fuel and resulting in a release of chemical energy in the form of temperature and pressure spikes within combustion chamber 22. During a first phase of the power/exhaust/intake stroke, the pressure spike within combustion chamber 22 may force piston 24 downward, thereby imparting mechanical power to crankshaft 30. At a particular point during this downward travel, one or more gas exchange ports (e.g., exhaust ports) 34 located within cylinder head 20 may open to allow pressurized exhaust within combustion chamber 22 to exit and the cycle will restart.

Liquid fuel injector 36 may be positioned inside cylinder head 20 and configured to inject liquid fuel into a top of combustion chamber 22 by releasing fuel axially towards an interior of cylinder liner 18 in a generally cone-shaped pattern. Liquid fuel injector 36 may be configured to cyclically inject a fixed amount of liquid fuel, for example, depending on a current engine speed and/or load. In one embodiment, engine 10 may be arranged to run on liquid fuel injections alone or a smaller amount of liquid fuel mixed with the gaseous fuel. The gaseous fuel may be injected through air intake port 32 into combustion chamber 22 via any number of gaseous fuel injectors 38. The gaseous fuel may be injected radially into combustion chamber 22 through a corresponding air intake port 32 after the air intake port 32 is opened by movement of piston 24.

Engine 10, utilizing fuel system 14, may consume two types of fuels when it is run as a dual-fuel engine. It is contemplated that the gaseous fuel may produce between 40% and 85% of a total energy output of engine 10. For example, the gaseous fuel may produce between 60% and 65% of the total energy output, with the liquid fuel producing the remaining 35% to 40%. In any case, the liquid fuel can act as an ignition source such that a smaller amount will be necessary than what is needed for engine 10 if it were running on only liquid fuel.

As shown in FIG. 1, gaseous fuel injector 38 may be positioned adjacent a wall 42 of engine block 12, such that a nozzle 54 of injector 38 is in direct communication with one of air intake ports 32 of an adjacent engine cylinder 16. Gaseous fuel injector 38 may be connected at an opposing external end to power and control components (not shown) of fuel system 14. These components may include, among other things, wiring to supply electrical power, a means to convert the electrical power into mechanical power (e.g. a solenoid), a controller configured to provide signals to the solenoid, and/or a regulator that at least partially controls a flow rate and/or pressure of fuel into cylinder 16. A supply line 52 may be positioned inside an air box 40 and connected between gaseous fuel injector 38 and a fuel source (not shown) at a distal end. It is contemplated that supply line 52 may supply gaseous fuel to multiple gaseous fuel injectors 38, if desired. That is, supply line 52 may function as a manifold that extends along a length of air box 40 and engine 10.

High temperatures inside engine 10 may be created by fuel combustion inside cylinder 16 and through frictional heat produced by rapidly moving parts, such as piston 24. The heat may emanate to nearby parts of engine 10, causing their temperature to rise. One of these parts may include gaseous fuel injector 38.

Cooling may be required to maintain gaseous fuel injector 38 at working temperatures that improve efficiency and to achieve a desirable part lifetime. Temperatures may be lowered by supplying a coolant to absorb some of the heat from gaseous fuel injector 38 and its surroundings and/or by supplying a lubricant to reduce friction within gaseous fuel injector 38. In the disclosed embodiments, gaseous fuel injector 38 may need to be in a surrounding temperature of approximately 170 to 180° F. in order to operate properly. That is, air box 40, in which gaseous fuel injector 38 is situated, may need to be cooled to less than about 170 to 180° F. For this purpose, a primary cooling line 66 may run inside air box 40 to supply a coolant to various parts of engine 10 and/or to maintain the temperature inside air box 40 at the desired level. Primary cooling line 66 may be a dedicated coolant supply line that supplies a coolant to various parts of engine 10 or, alternatively, primary cooling line 66 may represent an oil supply line that supplies oil to the components of engine 10 and also cools air box 40.

An additional cooling scheme may be necessary to further cool gaseous fuel injector 38 and its constituent parts, since gaseous fuel injector 38 may be directly adjacent cylinder 16. Specifically, it may be possible for gaseous fuel injector 38 to reach temperatures as high as 210° F., even when air box 40 is cooled to below 170-180° F. Above these temperatures, any electrical components of gaseous fuel injector 38 may work inefficiently or fail completely.

The coolant supplied by primary cooling line 66 may be utilized to cool gaseous fuel injector 38 in the same manner it cools other parts of engine 10. In particular, an auxiliary cooling line 70 may be routed from primary cooling line 66 to individual gaseous fuel injectors 38 to cool the components of gaseous fuel injectors 38 via conductive heat transfer. Various arrangements for routing auxiliary cooling line 70 may be possible.

As depicted in FIG. 1, auxiliary cooling line 70 may be configured to direct coolant into or near gaseous fuel injector 38. For example, coolant in auxiliary cooling line 70 may directly cool gaseous fuel injector 38 by routing coolant into a valve block 53 housing components of gaseous fuel injector 38 and/or by directing coolant through or over nozzle 54 of gaseous fuel injector 38. Alternatively, coolant may indirectly cool gaseous fuel injector 38 by allowing coolant to flow through a cooling jacket (not shown) that surrounds one or more components of gaseous fuel injector 38 that need to be cooled. The coolant, after passing through or around gaseous fuel injector 38, may be directed back to engine block 12 via return passage 68.

Figure 2:
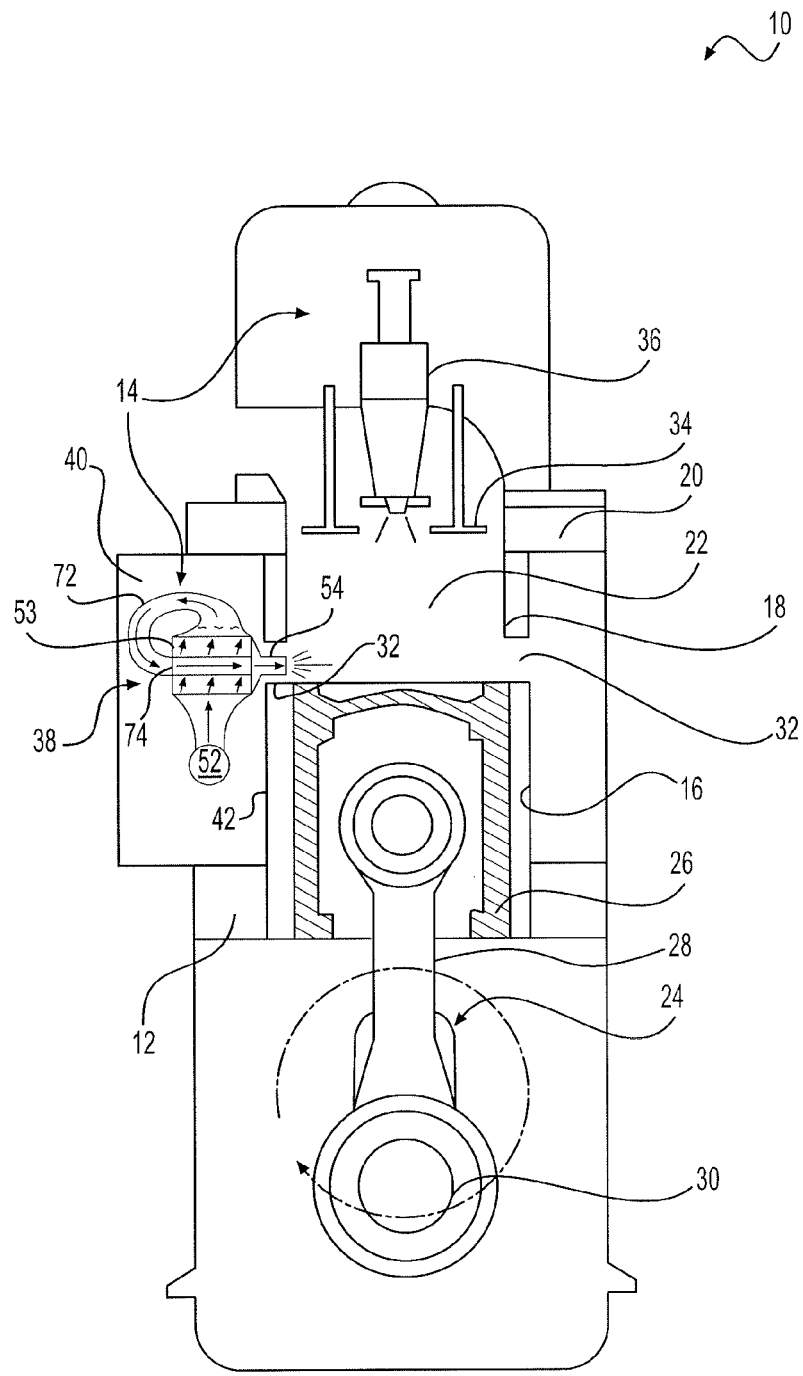
FIG. 2 is a cross-sectional illustration of the dual-fuel engine equipped with another exemplary disclosed fuel system.

FIG. 2 depicts an alternative embodiment, in which cooling may be achieved by fuel that is subsequently injected into cylinder 16 by gaseous fuel injector 38. That is, instead of recirculating the coolant from gaseous fuel injector 38 back into engine 10, the coolant (being liquefied natural gas) may instead be directed via a fuel cooling line 72 into gaseous fuel injector 38 for injection. Specifically, fuel, after passing through and cooling gaseous fuel injector 38, may be directed through fuel cooling line 72 into an injection conduit 74 of gaseous fuel injector 38.

Liquefied Natural Gas (LNG) may need to be stored at a low temperature of about −165° C., which works well in the cooling process described above. In addition, the LNG must change states before being injected by gaseous fuel injector 38 as a gaseous fuel. This state change may require the temperature of the LNG to be raised above about −160° C. In the disclosed embodiment the LNG, as it passes through and/or around valve block 53 of gaseous fuel injector 38, may reach the elevated temperature required for gasification, just prior to entering the injection conduit 74 of gaseous fuel injector 38 for injection into combustion chamber 22.

INDUSTRIAL APPLICABILITY

Fuel system 14 may be used in conjunction with any gaseous fueled or dual-fuel engine. Fuel system 14 may be a substitute for a liquid-only system in order to utilize the associated engine in a cleaner and more cost-efficient manner. Either application may utilize one of the exemplary disclosed cooling arrangements to provide the necessary cooling of gaseous fuel injector 38.

In use, fuel system 14 may supply liquid fuel and/or gaseous fuel to combustion chamber 22 of cylinder 16. Combustion of the fuel inside cylinder 16 may cause pressure and temperature spikes. Surrounding engine parts (e.g. gaseous fuel injector 38) may increase in temperature due to this process. The cooling arrangements depicted in FIGS. 1-2 may be utilized to cool gaseous fuel injector 38.

As described above, the cooling arrangement of FIG. 1 may utilize a dedicated coolant or an engine lubrication oil to cool gaseous fuel injector 38. This may be possible because the coolant and/or oil may typically be supplied at a temperature below a working temperature of gaseous fuel injector 38. The lower temperature coolant or oil may only need to be directed through air box 40 to the components of gaseous fuel injector 38. For example, the coolant and/or oil may need to pass through or around valve block 53 and/or nozzle 54 of gaseous fuel injector 38. The close proximity of the lower temperature coolant and/or oil may absorb heat through conductive heat transfer from the higher temperature components of gaseous fuel injector 38. This heat transfer may help to maintain gaseous fuel injector 38 below threshold levels that help preserve the efficiency and integrity of its components.

As depicted in FIG. 2, the fuel injected by gaseous fuel injector 38 may first be brought to gaseous fuel injector 38 by strategically routing the fuel from supply line 52 through and/or around valve block 53 and nozzle 54. As the LNG passes through or around valve block 53 and nozzle 54, heat emanating from gaseous fuel injector 38 may be absorbed by the fuel and used to gasify the fuel prior to injection.

The use of coolant in auxiliary cooling line 70 may be particularly practical when the engine is in a single-fuel mode because gaseous fuel injector 38 may not be in use to inject gaseous fuel, but a need for cooling would remain.

The use of LNG to cool gaseous fuel injector 38 may be beneficial to reduce the number of parts required to allow fuel system 14 to operate. In particular, components normally used to gasify the LNG may be reduced or omitted by using cooling components to accomplish both cooling and gasification operations. This may be especially advantageous if fuel system 14 is utilized in a retrofit application.

It will be apparent to those skilled in the art that various modifications and variations can be made to the disclosed engine and fuel system. Other embodiments will be apparent to those skilled in the art from consideration of the specification and practice of the disclosed fuel system. It is intended that the specification and examples be considered as exemplary only, with a true scope being indicated by the following claims and their equivalents.

What is claimed is:

1. A fuel system for an engine, comprising:
   an air box fluidly connected to a combustion chamber defined by a cylinder of the engine by an air intake port formed in a side of the cylinder;
   a gaseous fuel injector mounted inside the air box and configured to inject gaseous fuel radially into the combustion chamber through the air intake port;
   a primary cooling line configured to circulate a coolant through the engine; and
   an auxiliary cooling line positioned inside the air box and fluidly connecting the primary cooling line with the gaseous fuel injector.

2. The fuel system of claim 1, wherein the air box houses the primary cooling line.

3. The fuel system of claim 2, wherein the fuel system is configured to direct air through the air intake port of the cylinder.

4. The fuel system of claim 3, wherein at least a portion of the gaseous fuel injector is mounted at inside the air intake post to inject gaseous fuel with the incoming air.

5. The fuel system of claim 1, wherein the auxiliary cooling line directs coolant around a valve block of the gaseous fuel injector.

6. The fuel system of claim 1, wherein the auxiliary cooling line directs coolant through a valve block of the gaseous fuel injector.

7. The fuel system of claim 1, further including a liquid fuel injector configured to inject liquid fuel into the cylinder.

8. The fuel system of claim 1, further including a return line fluidly connecting the auxiliary cooling line to the primary cooling line.

9. The fuel system of claim 1, wherein the coolant is water.

10. The fuel system of claim 1, wherein the coolant is oil.

11. The fuel system of claim 1, wherein the coolant is fuel to be injected by the gaseous fuel injector.

12. A method of cooling a fuel injector of an engine comprising:
    circulating a coolant via a primary cooling line located in an air box of the engine;
    directing the coolant through an auxiliary cooling line to a gaseous fuel injector to cool the gaseous fuel injector; and
    returning the coolant to the engine;
    wherein the aft box is fluidly connected to a combustion chamber defined by a cylinder of the engine by an air intake port formed in a side of the cylinder, and
    wherein the gaseous fuel injector is mounted inside the air box with at least a portion thereof mounted inside the air intake port.

13. The method of claim 12, further including directing air from the air box of the engine through the air intake port.

14. The method of claim 13, further including injecting gaseous fuel from the gaseous fuel injector through the air intake port with the incoming air.

15. The method of claim 12, wherein directing the coolant to a gaseous fuel injector includes directing the coolant around a valve block of the gaseous fuel injector.

16. The method of claim 12, wherein directing the coolant to a gaseous fuel injector includes directing the coolant through a valve block of the gaseous fuel injector.

17. The method of claim 12, wherein the coolant is water.

18. The method of claim 12, wherein the coolant is oil.

19. The method of claim 12, wherein the coolant is fuel to be injected by the gaseous fuel injector.

20. An engine comprising:
    an engine block defining a cylinder;
    a piston;
    a combustion chamber at least partially defined by the cylinder and the piston;
    a plurality of air intake ports defined by the cylinder;
    an air box fluidly connected to the combustion chamber by the plurality of intake ports;
    a gaseous fuel injector configured to inject gaseous fuel radially through one of the plurality of air intake ports and into a cylinder of the engine;
    a primary cooling line configured to circulate a coolant through the engine; and an auxiliary cooling line mounted inside the air box and fluidly connecting the primary cooling line with the gaseous fuel injector, wherein the gaseous fuel injector is mounted inside the air box with at least a portion thereof mounted inside the air intake port.

* * * * *